US010102689B2

(12) United States Patent
Hergesheimer et al.

(10) Patent No.: US 10,102,689 B2
(45) Date of Patent: *Oct. 16, 2018

(54) SYSTEMS AND METHODS FOR LOCATION REPORTING OF DETECTED EVENTS IN VEHICLE OPERATION

(71) Applicant: CalAmp Corp., Oxnard, CA (US)

(72) Inventors: Peter Hergesheimer, Encinitas, CA (US); Alexandre Dlagnekov, Escondido, CA (US)

(73) Assignee: CALAMP CORP, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/223,094

(22) Filed: Jul. 29, 2016

(65) Prior Publication Data

US 2016/0335813 A1    Nov. 17, 2016

Related U.S. Application Data

(63) Continuation of application No. 13/729,702, filed on Dec. 28, 2012, now Pat. No. 9,406,222.

(Continued)

(51) Int. Cl.
*G08B 23/00* (2006.01)
*G07C 5/00* (2006.01)
(Continued)

(52) U.S. Cl.
CPC .............. *G07C 5/008* (2013.01); *G01S 19/10* (2013.01); *G07C 5/02* (2013.01); *G08C 19/00* (2013.01); *H04Q 9/00* (2013.01)

(58) Field of Classification Search
None
See application file for complete search history.

(56) References Cited

U.S. PATENT DOCUMENTS 4,497,025 A    1/1985    Hannoyer
4,549,277 A    10/1985   Brunson et al.
(Continued)

FOREIGN PATENT DOCUMENTS

EP    2056298 A1    5/2009
EP    2083276 A1    7/2009
(Continued)

OTHER PUBLICATIONS

"Road vehicles—Diagnostic Systems—Part 2: CARB requirements for interchange of digital information", ISO 9141-2, 1994, 18 pgs.

(Continued)

*Primary Examiner* — George Bugg
*Assistant Examiner* — Renee Dorsey

(57) ABSTRACT

Systems and methods for location reporting of detected events during vehicle operation in accordance embodiments of the invention are disclosed. In one embodiment of the invention, an event reporting telematics unit configured to report the location of events includes a first sensor configured to determine sensor information, a storage device configured to store sensor information and an event reporting application, and a processor, wherein the event reporting application configures the processor to receive a first sensor information using the first sensor, calculate a first sensor information timestamp, where the first sensor information timestamp is associated with the first sensor information, determine the occurrence of a vehicle event, complete the determination of the vehicle event, correlate the first sensor information with the determined event using the first sensor information timestamp, and determine the time corresponding to the beginning of the determined event.

20 Claims, 6 Drawing Sheets

Related U.S. Application Data

(60) Provisional application No. 61/715,715, filed on Oct. 18, 2012.

(51) Int. Cl.

| | | |
|---|---|---|
| *G08C 19/00* | | (2006.01) |
| *H04Q 9/00* | | (2006.01) |
| *G01S 19/10* | | (2010.01) |
| *G07C 5/02* | | (2006.01) |

(56) References Cited

U.S. PATENT DOCUMENTS

| | | |
|---|---|---|
| 5,058,020 A | 10/1991 | Matsuda |
| 5,117,375 A | 5/1992 | Worcester |
| 5,251,161 A | 10/1993 | Gioutsos et al. |
| 5,253,173 A | 10/1993 | Drobny et al. |
| 5,337,238 A | 8/1994 | Gioutsos et al. |
| 5,339,242 A | 8/1994 | Jensen et al. |
| 5,519,613 A | 5/1996 | Gioutsos et al. |
| 5,559,699 A | 9/1996 | Gioutsos et al. |
| 5,563,791 A | 10/1996 | Gioutsos et al. |
| 5,587,906 A | 12/1996 | Muckley et al. |
| 5,684,701 A | 11/1997 | Breed et al. |
| 5,754,115 A | 5/1998 | Woo |
| 5,758,301 A | 5/1998 | Saito et al. |
| 5,780,782 A | 7/1998 | O'Dea et al. |
| 5,805,460 A | 9/1998 | Greene et al. |
| 5,825,283 A | 10/1998 | Camhi |
| 5,841,201 A | 11/1998 | Ibaraki et al. |
| 5,862,511 A | 1/1999 | Croyle |
| 5,978,722 A | 11/1999 | Takasuka et al. |
| 6,029,111 A | 2/2000 | Croyle |
| 6,076,028 A | 6/2000 | Donnelly |
| 6,085,151 A | 7/2000 | Farmer et al. |
| 6,163,690 A | 12/2000 | Lilja |
| 6,236,921 B1 | 5/2001 | McConnell |
| 6,269,290 B1 | 7/2001 | Tsuji et al. |
| 6,308,134 B1 | 10/2001 | Croyle et al. |
| 6,346,876 B1 | 2/2002 | Flick |
| 6,356,841 B1 | 3/2002 | Hamrick et al. |
| 6,363,308 B1 | 3/2002 | Potti et al. |
| 6,401,027 B1 | 6/2002 | Xu et al. |
| 6,417,802 B1 | 7/2002 | Diesel et al. |
| 6,431,593 B1 | 8/2002 | Cooper et al. |
| 6,438,475 B1 | 8/2002 | Gioutsos et al. |
| 6,532,419 B1 | 3/2003 | Begin |
| 6,540,255 B1 | 4/2003 | Garcia et al. |
| 6,611,755 B1 | 8/2003 | Coffee et al. |
| 6,737,989 B2 | 5/2004 | Flick |
| 6,756,885 B1 | 6/2004 | Flick |
| 6,812,888 B2 | 11/2004 | Drury et al. |
| 6,832,140 B2 | 12/2004 | Fan et al. |
| 7,015,830 B2 | 3/2006 | Flick |
| 7,020,501 B1 | 3/2006 | Elliott et al. |
| 7,085,637 B2 | 8/2006 | Breed et al. |
| 7,110,880 B2 | 9/2006 | Breed et al. |
| 7,250,850 B2 | 7/2007 | Mizutani |
| 7,272,493 B1 | 9/2007 | Hamrick et al. |
| 7,286,929 B2 | 10/2007 | Staton et al. |
| 7,348,895 B2 | 3/2008 | Lagassey et al. |
| 7,366,608 B2 | 4/2008 | Hamrick et al. |
| 7,460,954 B2 | 12/2008 | Hamrick et al. |
| 7,484,756 B2 | 2/2009 | Chou et al. |
| 7,527,288 B2 | 5/2009 | Breed et al. |
| 7,577,525 B2 | 8/2009 | Hamrick et al. |
| 7,643,919 B2 | 1/2010 | Nicaise |
| 7,671,727 B2 | 3/2010 | Flick |
| 7,725,218 B2 | 5/2010 | Hamrick et al. |
| 7,765,039 B1 | 7/2010 | Hagenbuch |
| 7,805,231 B2 | 9/2010 | Cluff et al. |
| 8,004,397 B2 | 8/2011 | Forrest et al. |
| 8,010,251 B2 | 8/2011 | Hamrick et al. |
| 8,032,278 B2 | 10/2011 | Flick |
| 8,489,271 B2 | 7/2013 | Hergesheimer et al. |
| 8,688,380 B2 | 4/2014 | Cawse et al. |
| 8,762,009 B2 | 6/2014 | Ehrman et al. |
| 8,799,034 B1 | 8/2014 | Brandmaier et al. |
| 8,812,173 B2 | 8/2014 | Chen et al. |
| 9,002,538 B2 | 4/2015 | Hergesheimer et al. |
| 9,179,497 B1 | 11/2015 | Teixeira et al. |
| 9,217,757 B2 | 12/2015 | Hergesheimer et al. |
| 9,406,222 B2 | 8/2016 | Hergesheimer et al. |
| 9,457,754 B1 | 10/2016 | Christensen et al. |
| 9,459,277 B2 | 10/2016 | Hergesheimer et al. |
| 9,644,977 B2 | 5/2017 | Camisa |
| 2002/0013648 A1 | 1/2002 | Feser et al. |
| 2002/0100310 A1 | 8/2002 | Begin |
| 2002/0135167 A1 | 9/2002 | Mattes et al. |
| 2003/0001368 A1 | 1/2003 | Breed et al. |
| 2003/0151507 A1 | 8/2003 | Andre et al. |
| 2003/0176959 A1 | 9/2003 | Breed et al. |
| 2004/0036261 A1 | 2/2004 | Breed et al. |
| 2004/0075539 A1 | 4/2004 | Savoie et al. |
| 2004/0155790 A1 | 8/2004 | Tsuji et al. |
| 2004/0257208 A1 | 12/2004 | Huang et al. |
| 2005/0065711 A1 | 3/2005 | Dahlgren et al. |
| 2005/0099289 A1 | 5/2005 | Arita et al. |
| 2006/0022469 A1 | 2/2006 | Syed et al. |
| 2006/0041336 A1 | 2/2006 | Schubert et al. |
| 2006/0047459 A1 | 3/2006 | Underbrink et al. |
| 2006/0050953 A1 | 3/2006 | Farmer et al. |
| 2007/0027612 A1 | 2/2007 | Barfoot et al. |
| 2007/0109117 A1 | 5/2007 | Heitzmann et al. |
| 2007/0257791 A1 | 11/2007 | Arita et al. |
| 2007/0266078 A1 | 11/2007 | Rittle et al. |
| 2007/0271014 A1 | 11/2007 | Breed |
| 2007/0299587 A1 | 12/2007 | Breed et al. |
| 2008/0111666 A1 | 5/2008 | Plante et al. |
| 2008/0114545 A1 | 5/2008 | Takaoka et al. |
| 2008/0150707 A1 | 6/2008 | Shamoto |
| 2008/0195261 A1 | 8/2008 | Breed |
| 2008/0202199 A1 | 8/2008 | Finley |
| 2008/0211666 A1 | 9/2008 | Saidi et al. |
| 2008/0211914 A1 | 9/2008 | Herrera et al. |
| 2008/0275601 A1 | 11/2008 | Saito et al. |
| 2008/0281618 A1* | 11/2008 | Mermet ............... G06Q 10/08 705/1.1 |
| 2009/0037056 A1 | 2/2009 | Erb |
| 2009/0217733 A1 | 9/2009 | Stachow |
| 2010/0039216 A1 | 2/2010 | Knight et al. |
| 2010/0039247 A1 | 2/2010 | Ziegler et al. |
| 2010/0039318 A1 | 2/2010 | Kmiecik et al. |
| 2010/0097316 A1 | 4/2010 | Shaw |
| 2010/0185524 A1 | 7/2010 | Watkins |
| 2010/0279647 A1 | 11/2010 | Jacobs et al. |
| 2010/0312473 A1 | 12/2010 | Hoshizaki |
| 2010/0318257 A1 | 12/2010 | Kalinadhabhotla |
| 2011/0060496 A1 | 3/2011 | Nielsen et al. |
| 2011/0106373 A1 | 5/2011 | Hergesheimer et al. |
| 2011/0109438 A1 | 5/2011 | Dijkstra et al. |
| 2011/0153367 A1 | 6/2011 | Amigo |
| 2011/0202225 A1 | 8/2011 | Willis et al. |
| 2011/0202305 A1 | 8/2011 | Willis et al. |
| 2011/0264393 A1 | 10/2011 | An |
| 2011/0320088 A1 | 12/2011 | Eom et al. |
| 2012/0022780 A1 | 1/2012 | Kulik et al. |
| 2012/0035881 A1 | 2/2012 | Rubin |
| 2012/0050095 A1 | 3/2012 | Scherzinger |
| 2012/0146766 A1 | 6/2012 | Geisler et al. |
| 2012/0158211 A1 | 6/2012 | Chen et al. |
| 2012/0253585 A1 | 10/2012 | Harvie |
| 2012/0253892 A1 | 10/2012 | Davidson |
| 2012/0259526 A1 | 10/2012 | Inoue |
| 2012/0303203 A1 | 11/2012 | Olsen et al. |
| 2013/0002415 A1 | 1/2013 | Walli |
| 2013/0024202 A1 | 1/2013 | Harris |
| 2013/0038439 A1 | 2/2013 | Saito et al. |
| 2013/0073142 A1 | 3/2013 | Hergesheimer et al. |
| 2013/0275001 A1 | 10/2013 | Hergesheimer et al. |
| 2013/0297137 A1 | 11/2013 | Fushiki et al. |
| 2014/0074353 A1 | 3/2014 | Lee et al. |
| 2014/0111354 A1 | 4/2014 | Hergesheimer et al. |
| 2014/0142886 A1 | 5/2014 | Hergesheimer et al. |

(56) References Cited

U.S. PATENT DOCUMENTS

| | | |
|---|---|---|
| 2014/0149145 A1 | 5/2014 | Peng |
| 2014/0180529 A1 | 6/2014 | Simon et al. |
| 2014/0236518 A1 | 8/2014 | Hergesheimer et al. |
| 2014/0236519 A1 | 8/2014 | Hergesheimer et al. |
| 2014/0358394 A1 | 12/2014 | Picciotti |
| 2015/0015385 A1 | 1/2015 | Tomita et al. |
| 2015/0051796 A1 | 2/2015 | Levy |
| 2015/0149218 A1 | 5/2015 | Bayley et al. |
| 2015/0339241 A1 | 11/2015 | Warner et al. |
| 2016/0341559 A1 | 11/2016 | Camisa |
| 2017/0017766 A1 | 1/2017 | Giraud |
| 2017/0023610 A1 | 1/2017 | Hergesheimer et al. |
| 2017/0236339 A1 | 8/2017 | Camisa |
| 2018/0164401 A1 | 6/2018 | Hergesheimer |

FOREIGN PATENT DOCUMENTS

| | | |
|---|---|---|
| JP | 2007178295 A | 7/2007 |
| WO | 2000017607 | 3/2000 |
| WO | 2002018873 | 3/2002 |
| WO | 2014081485 | 5/2014 |
| WO | 2014130077 A1 | 8/2014 |
| WO | 2014130078 A1 | 8/2014 |
| WO | 2015183677 A1 | 12/2015 |
| WO | 2016191306 | 12/2016 |

OTHER PUBLICATIONS

"Surface Vehicle Recommended Practice, E/E Diagnostic Test Modes, Dec. 1991, 32 pgs."
"Surface Vehicle Recommended Practice, Universal Interface for OBD II Scan, Jun. 30, 1993, 45 pgs.", SAE International Surface Vehicle Recommended Practice, "Universal Interface for OBD II Scan", SAE Standard J2201, Issued Jun. 30, 1993.
"Surface Vehicle Recommended Practice; OBD II Scan Tool, Mar. 1992, 14 pgs."
Extended European Search Report for European Application No. 13875407.2, Search completed Nov. 22, 2016, dated Nov. 30, 2016, 7 pgs.
Extended European Search Report for European Application No. 17160719.5, Search completed Apr. 6, 2017, dated Apr. 18, 2017, 6 pgs.
International Preliminary Report on Patentability for International Application PCT/US2013/054956, Report dated May 26 2015, dated Jun. 4, 2015, 9 pgs.
International Preliminary Report on Patentability for International Application PCT/US2013/054939, dated Aug. 25, 2015, dated Sep. 3, 2015, 4 pgs.
International Preliminary Report on Patentability for International Application PCT/US2013/054943, dated Aug. 25, 2015, dated Sep. 3, 2015, 6 pgs.
International Search Report and Written Opinion for International Application No. PCT/US13/54939, Completed Feb. 5, 2014, dated Feb. 24, 2014, 5 pgs.
International Search Report and Written Opinion for International Application No. PCT/US13/54943, Completed Feb. 13, 2014, dated Feb. 27, 2014, 6 pgs.
International Search Report and Written Opinion for International Application No. PCT/US2013/054956, International Filing Date Aug. 14, 2013, Search Completed Feb. 11, 2014, dated Mar. 6, 2014, 9 pgs.
International Search Report and Written Opinion for International Application No. PCT/US2016/033621, completed Jul. 28, 2016, dated Aug. 5, 2016, 11 pgs.
Memsic 2125 Dual-Axis Accelerometer (#28017) Data Sheet (Parallax Inc., v2.0 Jan. 29, 2009).

* cited by examiner

SYSTEMS AND METHODS FOR LOCATION REPORTING OF DETECTED EVENTS IN VEHICLE OPERATION

CROSS-REFERENCE TO RELATED APPLICATIONS

The current application is a continuation of U.S. patent application Ser. No. 13/729,702, filed Dec. 28, 2012 and issued as U.S. Pat. No. 9,406,222 on Aug. 2, 2016, which claims the benefit of U.S. Provisional Patent Application No. 61/715,715, filed on Oct. 18, 2012, the disclosures of which are hereby incorporated by reference in their entirety.

FIELD OF THE INVENTION

The present invention is generally related to event detection in vehicle operation and more specifically to accurately reporting the location of the vehicle at the time the detected event begins.

BACKGROUND OF THE INVENTION

A Global Positioning System (GPS) is a space-based global navigation satellite system that utilizes a network of geo-synchronous satellites that can be utilized by a GPS receiver to determine its location. Many telematics systems incorporate a Global Positioning System (GPS) receiver, which can be used to obtain the location of a vehicle at a certain measured time. By comparing the location of a vehicle at a plurality of measured times, the speed of the vehicle can be determined. The acceleration of the vehicle can be determined as the change in speed divided by the time between the measurements. A GPS receiver's ability to determine acceleration can be limited due to the dependence of the measurement upon factors such as reception and satellite availability. In addition to location information, a GPS receiver can also be configured to provide time data.

Telematics is the integrated use of telecommunications and informatics. Telematics units are installed in vehicles to provide a variety of telematics functionality in the vehicle. This functionality includes, but is not limited to, emergency warning systems, navigation functionality, safety warnings, and automated driving assistance. Telematics units are also capable of recording data related to the operation of the vehicle and providing that information for analysis, whether in real-time or during a time when the vehicle is being serviced. This information can be used in a variety of applications, such as fleet tracking, shipment tracking, insurance calculations, and in vehicle management and service.

SUMMARY OF THE INVENTION

Systems and methods for location reporting of detected events during vehicle operation in accordance embodiments of the invention are disclosed. In one embodiment of the invention, an event reporting telematics unit configured to report the location of events includes a first sensor configured to determine sensor information, a storage device configured to store sensor information and an event reporting application, and a processor, wherein the event reporting application configures the processor to receive a first sensor information using the first sensor, calculate a first sensor information timestamp, where the first sensor information timestamp is associated with the first sensor information, determine the occurrence of a vehicle event, complete the determination of the vehicle event, correlate the first sensor information with the determined event using the first sensor information timestamp, and determine the time corresponding to the beginning of the determined event.

In an additional embodiment of the invention, the event reporting telematics unit includes a second sensor configured to determine sensor information and the event reporting application further configures the processor to receive a second sensor information using the second sensor, calculate a second sensor information timestamp, where the second sensor information timestamp is associated with the second sensor information, and correlate the second sensor information with the determined event using the second sensor information timestamp.

In another embodiment of the invention, the event reporting application further configures the processor to determine the location corresponding to the beginning of the vehicle event using the information selected from the group including the first sensor information timestamp and the second sensor information timestamp.

In yet another additional embodiment of the invention, the first vehicle sensor and the second vehicle sensor are selected from the group including an accelerometer, an airbag deployment sensor, a vibration sensor, a compass, a voltage measuring sensor, a resistance measuring sensor, a current measuring sensor, an impact sensor, and a temperature sensor.

In still another additional embodiment of the invention, the event reporting telematics unit further includes a Global Positioning System (GPS) receiver and the event reporting application further configures the processor to determine a first location using the GPS receiver, calculate a first location timestamp, where the first location timestamp is associated with the determined first location, and determine the location corresponding to the beginning of the determined event using the first location and the first location timestamp.

In yet still another additional embodiment of the invention, the event reporting application further configures the processor to determine the location corresponding to the beginning of the determined event by performing a dead reckoning process using the first location, the first location timestamp, the first sensor information, and the first sensor information timestamp.

In yet another embodiment of the invention, the event reporting application further configures the processor to determine a plurality of locations using the GPS receiver, calculate a plurality of location timestamps corresponding to one or more of the plurality of locations, and estimate the location corresponding to the beginning of the determined event using at least one of the plurality of location timestamps and at least one of the plurality of locations.

In still another embodiment of the invention, the event reporting application further configures the processor to determine the location corresponding to the beginning of the determined event using the first location timestamp and at least one of the plurality of location timestamps.

In yet still another embodiment of the invention, the event reporting application further configures the processor to calculate the first sensor information timestamp when the first sensor information exceeds a threshold value.

In yet another additional embodiment of the invention, the event reporting telematics unit further includes a communications device and the event reporting application further configures the processor to transmit the determined vehicle event using the communications device.

Still another embodiment of the invention includes a method for reporting the location of detected events including receiving a first sensor information using an event reporting telematics unit, calculating a first sensor information timestamp using the event reporting telematics unit, where the first sensor information timestamp is associated with the first sensor information, determining the occurrence of a vehicle event using the event reporting telematics unit, completing the determination of the vehicle event using the event reporting telematics unit, correlating the first sensor information with the determined event using the first sensor information timestamp and the event reporting telematics unit, and determining the beginning of the vehicle event using the event reporting telematics unit.

In yet another additional embodiment of the invention, reporting the location of detected events further includes receiving a second sensor information using the event reporting telematics unit, calculating a second sensor information timestamp using the event reporting telematics unit, where the second sensor information timestamp is associated with the second sensor information, and correlating the second sensor information with the determined event using the second sensor information timestamp and the event reporting telematics unit.

In still another additional embodiment of the invention, reporting the location of detected events further includes determining the location corresponding to the beginning of the vehicle event using the information selected from the group including the first sensor information timestamp and the second sensor information timestamp.

In yet still another additional embodiment of the invention, the first vehicle sensor and the second vehicle sensor are selected from the group including an accelerometer, an airbag deployment sensor, a vibration sensor, a compass, a voltage measuring sensor, a resistance measuring sensor, a current measuring sensor, an impact sensor, and a temperature sensor.

In yet another embodiment of the invention, reporting the location of detected events further includes determining a first location using the event reporting telematics unit, calculating a first location timestamp using the event reporting telematics unit, where the first location timestamp is associated with the determined first location, and determining the location corresponding to the beginning of the determined event using the first location, the first location timestamp, and the event reporting telematics unit.

In still another embodiment of the invention, reporting the location of detected events further includes determining the location corresponding to the beginning of the determined event by performing a dead reckoning process using the first location, the first location timestamp, the first sensor information, the first sensor information timestamp, and the event reporting telematics unit.

In yet still another embodiment of the invention, reporting the location of detected events further includes determining a plurality of locations using the event reporting telematics unit, calculating a plurality of location timestamps corresponding to one or more of the plurality of locations using the event reporting telematics unit, and estimating the location corresponding to the beginning of the determined event using at least one of the plurality of location timestamps, at least one of the plurality of locations, and the event reporting telematics unit.

In yet another additional embodiment of the invention, reporting the location of detected events further includes determining the location corresponding to the beginning of the determined event using the first location timestamp, at least one of the plurality of location timestamps, and the event reporting telematics unit.

In still another additional embodiment of the invention, reporting the location of detected events further includes calculating the first sensor information timestamp using the event reporting telematics unit when the first sensor information exceeds a threshold value.

In yet still another additional embodiment of the invention, reporting the location of detected events further includes transmitting the determined vehicle event using the event reporting telematics unit.

DETAILED DESCRIPTION

Figure 1:
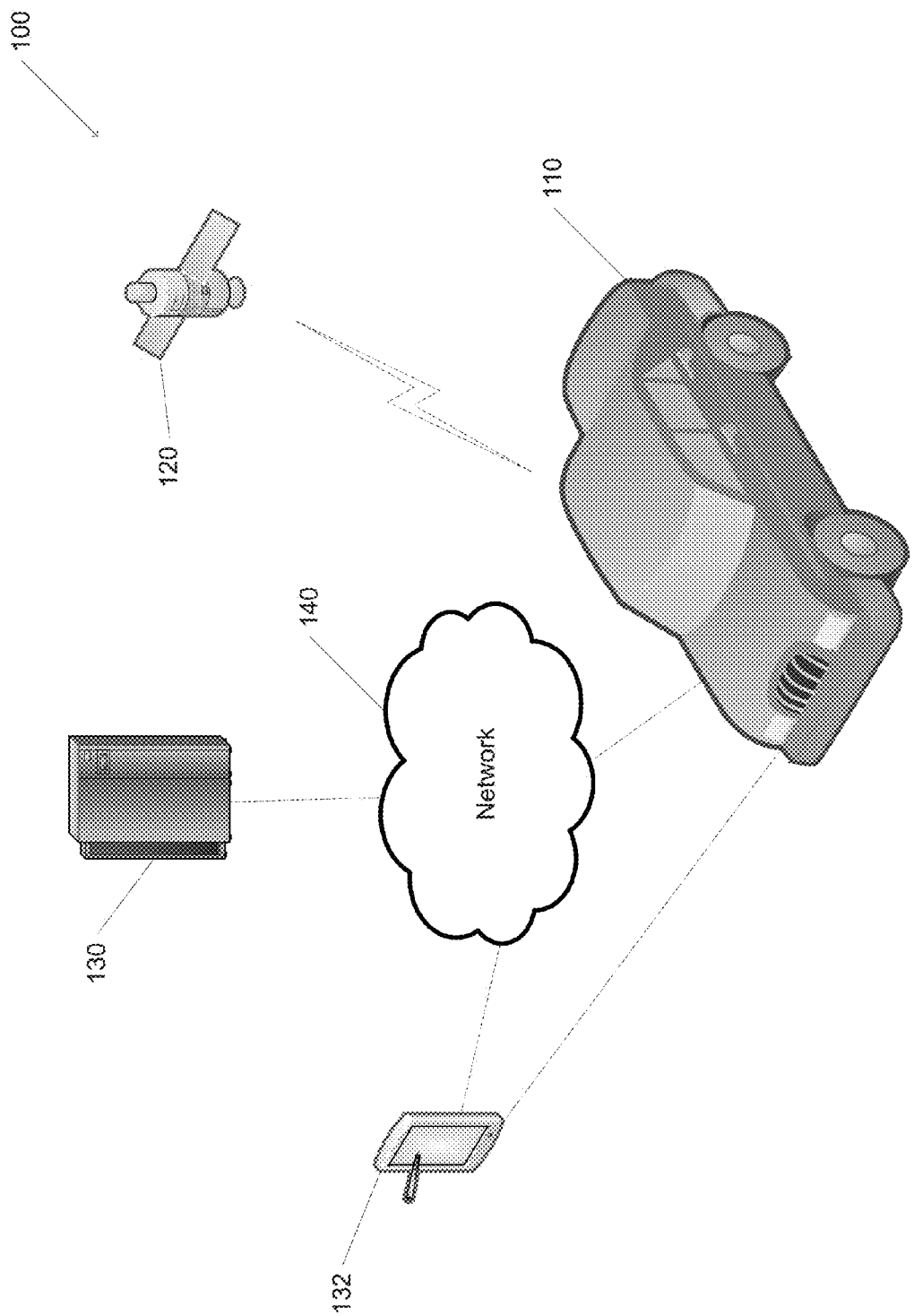
FIG. 1 conceptually illustrates a telematics system with a vehicle including an event reporting telematics unit in accordance with an embodiment of the invention.

Turning now to the drawings, systems and methods for reporting the location of detected events during the operation of a vehicle in accordance with embodiments of the invention are illustrated. Information related to the operation of a vehicle, including information concerning vehicle speed and acceleration, provides insight into driver behavior. Driver behaviors include, but are not limited to, performing hard cornering, excessive speeding, and suddenly stopping while driving. Vehicle behaviors include, but are not limited to, ignition detection, engine performance, braking performance, fuel economy, the location of the vehicle, the speed of the vehicle, and emission information.

In accordance with many embodiments of the invention, vehicle speed can be calculated using information provided by a Global Position System (GPS) receiver by dividing the distance traveled by the GPS receiver by the time between measurements taken by the GPS receiver. In several embodiments, the GPS receiver is configured to determine velocity information using the signals received by the GPS receiver. A GPS receiver can determine velocity information in a variety of ways in accordance with embodiments of the invention, including, but not limited to, measuring the Doppler shift of the received signals. The differences in vehicle speed between measurements taken by the GPS receiver can be used to determine acceleration information for the vehicle. GPS receivers are also capable of determining the location of a vehicle and/or the heading of the vehicle utilizing the received signals.

A variety of devices other than GPS receivers can be utilized in vehicles to determine information related to the vehicle, such as speed, acceleration, and heading. For example, acceleration information for a vehicle can be measured using an accelerometer, which are often installed on a vehicle or mobile device. Heading information can be determined using a compass. Vibration information can be determined using acceleration information taken using an acceleration sensor. Systems and methods for calibrating a 3-axis accelerometer which can be utilized to determine vibration information in accordance with a variety of embodiments of the invention is disclosed in U.S. patent application Ser. No. 13/622,844, titled "Systems and Methods for 3-Axis Accelerometer Calibration" and filed Sep. 19, 2012, the entirety of which is hereby incorporated by reference. Other devices not specifically described above can be utilized to measure or detect information relevant to the operation of a vehicle in accordance with embodiments of the invention. In several embodiments, the measured and/or detected information is utilized to detect events occurring in the operation of the vehicle.

Event reporting telematics units in accordance with embodiments of the invention are configured to measure and record a variety of data, such as, but not limited to, speed, acceleration, location, and heading information. This data can be processed in order to detect events regarding the operation of the vehicle, both to determine the behavior of the vehicle itself and the behavior of the driver of the vehicle. However, the detected events can occur over a period of time; likewise, the data corresponding to the detected event also spans a period of time. With traditional telematics units, this can result in certain data, such as the location of the vehicle when the detected event begins, not being available, or not being accurately reported as part of the information captured by the event reporting telematics unit. In many embodiments, event reporting telematics units are configured to record information captured during the operation of a vehicle and store the information for later processing, including detecting the occurrence of events and determining the location for the beginning of the event using the recorded data. In a variety of embodiments, event reporting telematics units are configured to detect events and/or determine the location of the detected event in real time. In several embodiments, event reporting telematics units are configured to transmit the recorded data, either in real-time or after the data has been recorded, to a remote server system for processing. Event reporting telematics units in accordance with embodiments of the invention are configured to determine when a detectable event is occurring and record the location of the vehicle at the start of the detected event. In several embodiments, event reporting telematics units are configured to determine the location of the vehicle at the start of the detected event by filtering data received by the event reporting telematics unit. In a number of embodiments, event reporting telematics units associate time information with the location of the vehicle.

In many embodiments of the invention, event reporting telematics units are configured to detect a plurality of events, where each event can have its own set of measured information indicating that the event has occurred. In a variety of embodiments, event reporting telematics units associate timestamps indicating the time the event is detected with the event. The parameters of the set of measured information can be stored by the event reporting telematics unit in a variety of ways, including, but not limited to, event detection profiles. In a number of embodiments, event reporting telematics units are configured to collect information and report events on the event reporting telematics unit itself. In several embodiments, event reporting telematics units are configured to record the data to be later transmitted and processed using a different computing device, such as a server system or a technician's service computer.

Systems and methods for event reporting telematics units and determining the location of detected events in the operation of a vehicle in accordance with embodiments of the invention are discussed further below.

Telematics System Overview

Event reporting telematics units are installed in vehicles to measure and record the behavior of the vehicle in operation. A conceptual illustration of a vehicle with an event reporting telematics unit installed is conceptually illustrated in FIG. 1. The telematics system 100 includes a vehicle 110 with an installed event reporting telematics unit. The vehicle 110 can receive signals from GPS satellites 120 received using a GPS receiver in the event reporting telematics unit and can communicate with server systems 130 and/or a service computer 132 using the event reporting telematics unit.

In many embodiments, the event reporting telematics unit installed in vehicle 110 contains a GPS receiver. In these embodiments, the vehicle 110 can receive signals from GPS satellites 120 in order to determine the location, speed, and/or heading of the vehicle 110. In several embodiments, the event reporting telematics unit is configured to determine location using a location reporting device other than a GPS receiver, such as, but not limited to, using cellular tower triangulation to determine the location of the vehicle 110. Similarly, speed information can be determined using accelerometers or other speed detection devices, while heading information can be determined using a compass or other heading detection device in accordance with a number of embodiments of the invention.

In several embodiments, the event reporting telematics unit installed in the vehicle 110 is configured to upload data to a server system 130 and/or service computer 132. The vehicle 110 can transmit data to the server system 130 and/or service computer 132 in a variety of ways, such as via a cellular data connection or via a wireless or wired network connection. In a number of embodiments, the vehicle transmits data to the server system 130 and/or service computer via a direct connection. In a variety of embodiments, the vehicle is configured to transmit data to the server system 130 and/or service computer 132 via a network 140, such as the Internet. A number of networks may be utilized in accordance with the requirements of embodiments of the invention. In many embodiments, the vehicle 110 is configured to transmit data to the server system 130 and/or service computer 132 via a vehicle data bus. In a number of embodiments, server system 130 and/or service computer 132 are configured to detect events using the data recorded using the event reporting telematics unit. In many embodiments, the vehicle 110 is configured to transmit detected events to the server system 130 and/or service computer 132. In several embodiments, the vehicle 110 receives event detection profiles via the server system 130 and/or service computer 132. The vehicle 110 utilizes these event detection profiles to configure the event reporting telematics unit installed in the vehicle 110 to detect the events defined in the received profiles.

Telematics systems in accordance with embodiments of the invention are described above with respect to FIG. 1; however, a variety of telematics systems can be utilized in accordance with embodiments of the invention. Systems and methods for location reporting of vehicular events using event reporting telematics units in accordance with embodiments of the invention are described below.

Event Reporting Telematics Unit Architecture

Figure 2:
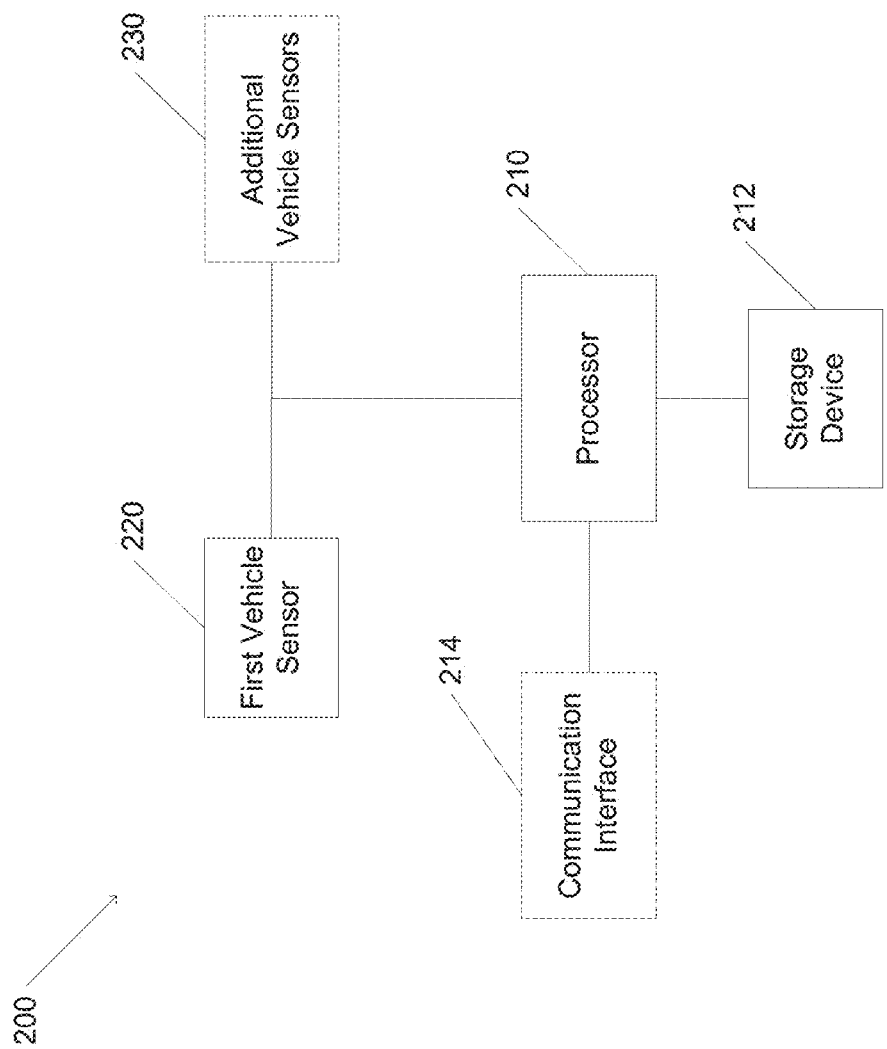
FIG. 2 conceptually illustrates an event reporting telematics unit configured to perform location reporting of detected events in accordance with an embodiment of the invention.

Event reporting telematics units are utilized in vehicles to determine, record, and/or report detected events related to behavior of the operation of a vehicle and to accurately determine the location of those detected events. An event reporting telematics unit in accordance with an embodiment of the invention is conceptually illustrated in FIG. 2. The event reporting telematics unit 200 includes a processor 210. The processor 210 is configured to detect an event and determine an accurate location corresponding to the detected event. In several embodiments, the processor 210 is configured to accumulate data related to a detected event for later analysis or transmission to a separate device. In many embodiments, the processor 210 is configured to detect multiple events. In a number of embodiments, the processor 210 is configured using event detection profiles to determine when an event has been detected.

The processor 210 is in communication with a first vehicle sensor 220. In many embodiments, the processor 210 is in communication with one or more additional vehicle sensors 230. The first vehicle sensor 220 and the one or more additional vehicle sensors 230 can include, but are not limited to, GPS receivers, accelerometers, compasses, altimeters, impact detection sensors, temperature sensors, and vibration sensors. The processor 210 is configured to detect events using data received using the first vehicle sensor 220. In many embodiments, the processor 210 is configured to detect events using data received using one or more of the additional vehicle sensors 230. In a number of embodiments, the processor 210 is configured to correlate data received using the first vehicle sensor 210 with data received using one or more of the additional vehicle sensors 230. In several embodiments, the processor 210 is configured to determine location information using the first vehicle sensor 210 based on information received using the first vehicle sensor 210 and/or one or more additional vehicle sensors 230.

The processor 210 is connected to a storage device 212 configured to store information related to a detected event, including information collected using the first vehicle sensor 220 and/or the additional vehicle sensors 230. In several embodiments, the storage device 212 is configured to store event detection profiles. In many embodiments, the processor 210 stores the location of detected events using the storage device 212. In a number of embodiments, the processor 210 stores several locations using the storage device 212 for later correlation with collected information. In many embodiments, the storage device 212 is configured to store a software application that configures the processor 210 to perform event detection with accurate location reporting.

In several embodiments, the processor 210 is connected to a communication interface 214. In accordance with embodiments, communication interface 214 includes, but is not limited to, vehicle bus interfaces, cellular data radios, Ethernet interfaces, wireless network interfaces, universal serial bus (USB) interfaces, and serial interfaces. In a number of embodiments, the processor 210 is configured to transmit detected events using the communication interface 214. In many embodiments, the processor 210 is configured to transmit information measured using the first vehicle sensor 220 and/or the additional vehicle sensors 230 using the communication interface 214. In a number of embodiments, the processor 210 is configured to transmit data using the communication interface 214 in real-time. In several embodiments, the processor 210 is configured to transmit data using the communication interface 214 on a schedule. In many embodiments, the processor 210 is configured to transmit data using the communication interface 214 upon receiving a request to transmit data. In a number of embodiments, the processor 210 is configured to receive event detection profiles using the communication interface 214.

A number of event reporting telematics units in accordance with embodiments of the invention are described above with respect to FIG. 2; however, a variety of event reporting telematics units can be utilized in accordance with embodiments of the invention. Processes for location reporting of detected events in the operation of a vehicle in accordance with embodiments of the invention are discussed further below.

Location Reporting of Detected Events

Figure 3:
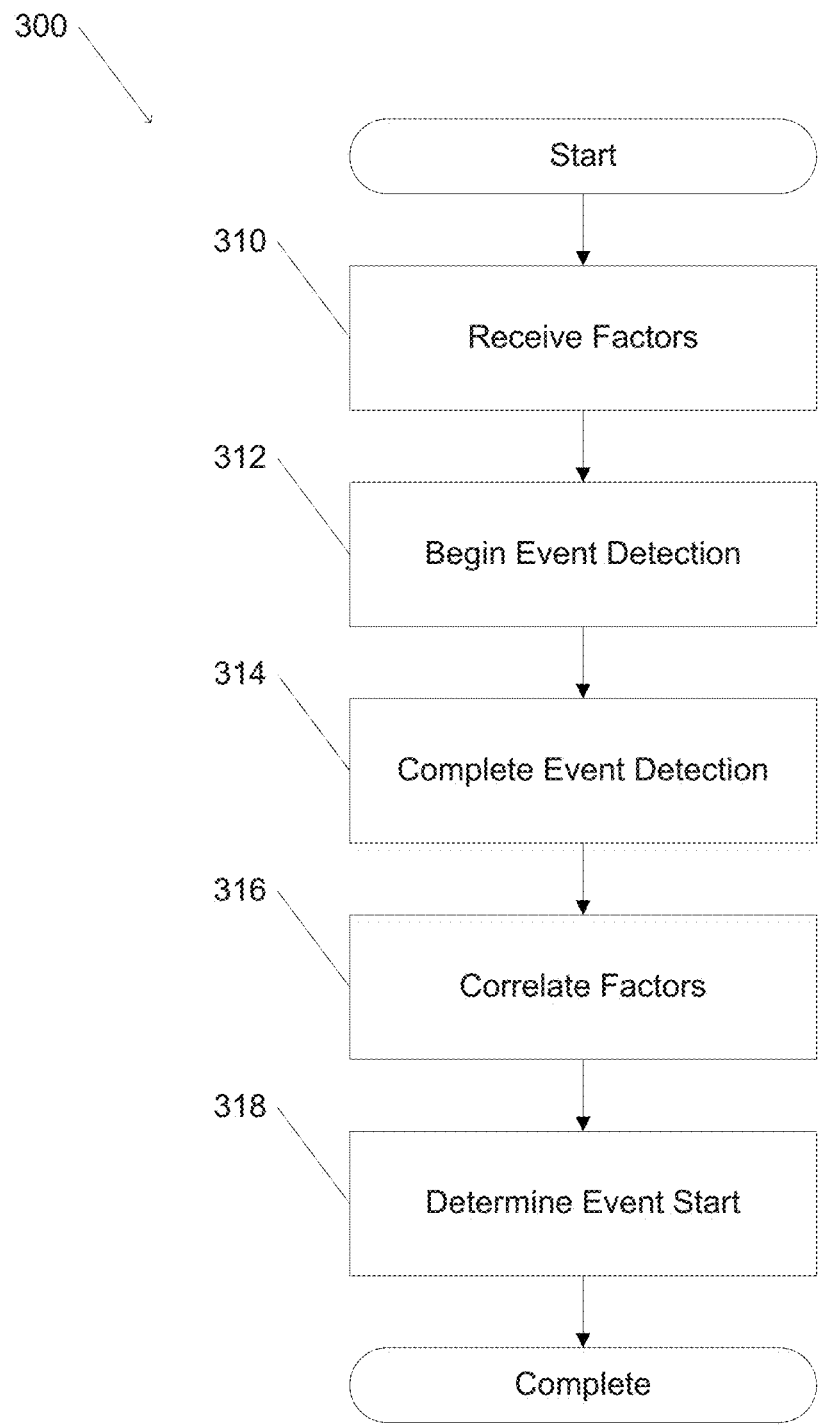
FIG. 3 is a flow chart illustrating a process for location reporting of detected events in vehicle operation in accordance with an embodiment of the invention.

In order to accurately determine the location of a detected event occurs, event reporting telematics units record the location of the vehicle at the start of the detected event with a certain degree of accuracy. A process for determining the location for the start of a detected event is illustrated in FIG. 3. The process 300 includes receiving (310) one or more factors related to the operation of the vehicle. Event detection begins (312). The event detection completes (314). The factors are correlated (316) to the detected event. The location of the start of the detected event is determined (318).

In many embodiments, the received (310) factors related to the operation of the vehicle include, but are not limited to, location information, speed, heading information, acceleration information, and ignition status. In a variety of embodiments, a timestamp is associated with one or more of the received (310) factors. In several embodiments, event detection begins (312) once one or more of the received (310) factors exceed a threshold value; the threshold value can be pre-determined and/or determined dynamically. In many embodiments, a timestamp is associated with the beginning (312) of the event detection. In a number of embodiments, multiple event detections can begin (312) using the same received (310) factors. In many embodiments, event detection completes (314) once one or more of the received (310) factors fall below a threshold value. In a variety of embodiments, a timestamp is associated with the completion (314) of the event detection. Correlating (316) factors includes filtering the received (310) factors in many embodiments of the invention. In several embodiments, correlating (316) received factors includes comparing timestamps associated with the factors. In a number of embodiments, determining (318) the location of the detected event utilizes the correlated (316) factors and/or timestamps associated with the factors. In many embodiments, beginning (312) event detection includes recording the location of the vehicle at that time and/or the time the location is recorded; this recorded location is the determined (318) location for the detected event. In a variety of embodiments, determining (318) the location for the detected event includes performing dead reckoning using the recorded location and/or the time the location was recorded.

In several embodiments, the received (310) factors are related to determining if a vehicle is traveling at a rate of speed exceeding a threshold value; the threshold value can be determined dynamically, such as based on weather conditions or location, or pre-determined. In many embodiments, the received (310) factors are related to determining if a vehicle has crossed a physical boundary. In a variety of embodiments, the received (310) factors are related to determining if a vehicle has deviated from a route; the route can be determined dynamically or be pre-determined. A number of factors can be correlated (316) with a detected event, including, but not limited to, the speed of a vehicle over a period of time, the acceleration of a vehicle over a period of time, the location of the vehicle at one or more points in time, the altitude of the vehicle over a period of time, the voltage, resistance, or current associated with one or more sensors, busses, and/or inputs in the vehicle, and/or data received via one or more sensors installed in the vehicle. Other factors not specifically listed can be utilized in accordance with a variety of embodiments of the invention.

Although specific processes for determining the location of a detected event are discussed above with respect to FIG. 3, any of a variety of processes, including those that obtain information related to the location, velocity, and/or acceleration of a vehicle, can be performed in accordance with embodiments of the invention. Processes for the location reporting of detected acceleration events in accordance with embodiments of the invention are discussed below.

Location Reporting of Detected Acceleration Events

Figure 4:
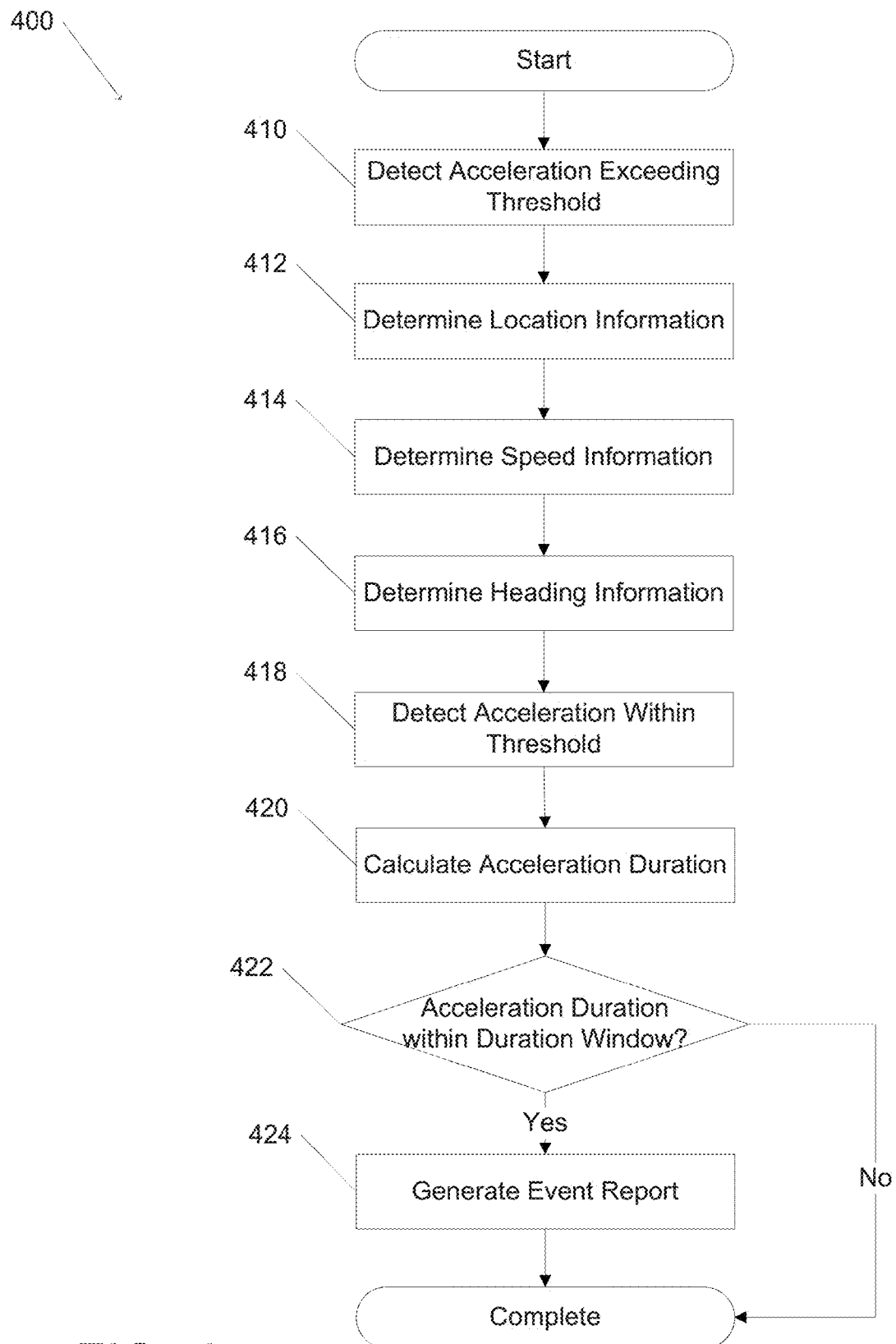
FIG. 4 is a flow chart illustrating a process for reporting detected events based upon acceleration of a vehicle in accordance with an embodiment of the invention.

Many events detected by event reporting telematics units during the operation of a vehicle correspond to vehicle behaviors including a sudden acceleration or deceleration of the vehicle. A process for determining the location for the start of a detected event based upon acceleration information is illustrated in FIG. 4. The process 400 includes detecting (410) acceleration exceeding an acceleration threshold value. Location information is determined (412). Speed information is determined (414). Heading information is determined (416). When the detected (418) acceleration falls below the acceleration threshold value, the duration of the acceleration is calculated (420). If the calculated (420) acceleration duration falls within (422) an acceleration duration window, an event report is generated (424) and the process completes. If the calculated acceleration duration does not fall within an acceleration duration window, an event report is not generated (424).

In several embodiments, the determined (412) location information, determined (414) speed information, and/or the determined (416) heading information is associated with a timestamp indicating the time the location information, speed information, and/or heading information was determined. In many embodiments, the acceleration threshold and/or the acceleration duration window is determined dynamically. In several embodiments, the acceleration threshold and/or the acceleration duration window is pre-determined. A number of embodiments of the invention include a plurality of acceleration thresholds and/or acceleration duration windows. In many embodiments, the acceleration threshold and/or the acceleration duration window is provided by an event detection profile. In a variety of embodiments, detecting (410) acceleration exceeding a threshold value and/or detecting (418) acceleration below a threshold value is associated with a timestamp at the time the threshold value is exceeded. In several embodiments, the generated (424) report includes the location information determined (412) at the beginning of the detected event. In a number of embodiments, the generated (424) report includes filtered location information generated using the determined (412) location information, determined (414) speed information, and/or determined (416) heading information. In a variety of embodiments, the generated (424) report includes an event start time determined using the timestamps associated with the determined (412) location information, determined (414) speed information, and/or determined (416) heading information.

Specific processes for determining the location for the start of a detected event based upon acceleration information are discussed above with respect to FIG. 4; however, a variety of processes, including those that obtain information other than location, speed, and heading information, can be performed in accordance with embodiments of the invention. Processes for correlating vehicular factors with detected events in accordance with embodiments of the invention are discussed below.

Location Reporting of Detected Input Changes

Figure 5:
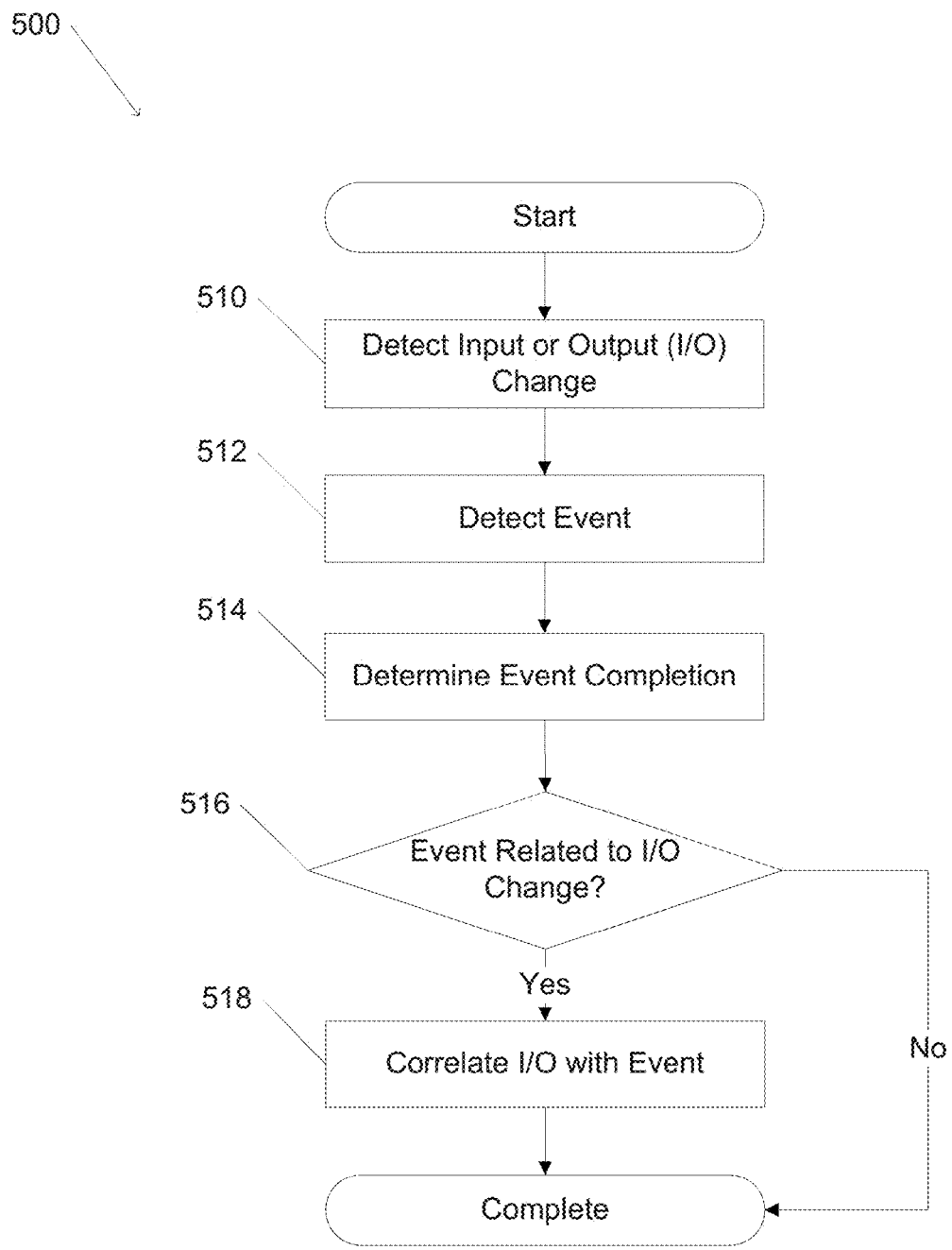
FIG. 5 is a flow chart illustrating a process for correlating an input change to a detected event in accordance with an embodiment of the invention.

Many events involving a vehicle that can be detected using event reporting telematics units are indicated by a change in an input or output (I/O) of the vehicle. However, not every I/O change corresponds to an event and the event may not be detected within a time threshold corresponding to when the I/O changes. A process for correlating changes in I/O in a vehicle to detected events in illustrated in FIG. 5. The process 500 includes detecting (510) an I/O change. An event is detected (512). The completion of the event is determined (514). A determination is made if the I/O change is related (516) to the detected event. If the event is related (516) to the I/O change, the event is correlated (518) with the I/O change.

In many embodiments, the detected (510) I/O change is related to the ignition state of the vehicle. Systems and methods for determining ignition state for a vehicle are disclosed in U.S. patent application Ser. No. 12/917,234, titled "Systems and Methods for Virtual Ignition Detection" and filed Nov. 1, 2010, the entirety of which is hereby incorporated by reference. In a number of embodiments, the detected (510) I/O change is a change in voltage. In several embodiments, the detected (510) I/O change is a change in the current of an input and/or an output. In a variety of embodiments, the detected (510) I/O change is a change in the resistance of an input and/or an output. A variety of detected (510) I/O changes not specifically described can be utilized in accordance with the requirements of many embodiments of the invention. In many embodiments, a timestamp is associated with one or more detected (510) I/O changes. In a number of embodiments, detecting (512) an event and/or determining (514) if the I/O change is related to the event can be performed utilizing a process described above with respect to FIG. 3; other processes can be utilized in accordance with a variety of embodiments of the invention. In a number of embodiments, timestamps associated with a detected (510) I/O change are utilized in detecting (512) an event and/or determining (514) if the I/O change is related to the event. In accordance with a number of embodiments, a detected (512) event includes one or more factors, where the factors describe conditions corresponding to the detected (512) event. In many embodiments, an I/O change is related (516) to an event if the I/O change is a factor in the event. In a variety of embodiments, the detected (510) I/O change occurs before the event is detected (512). In several embodiments, correlating (518) an I/O change with an event includes determining that the start of the detected (512) event is within a threshold value of the detected (510) I/O change. This threshold value can be determined dynamically or pre-determined. In a number of embodiments, correlating (518) an I/O change with an event includes associating a factor related to the I/O change and/or a timestamp associated with the I/O change with the event.

Specific processes for correlating I/O changes in a vehicle with detected events is described above with respect to FIG. 5; however, a variety of processes can be performed in accordance with embodiments of the invention. Processes for correlating information with a collision event in accordance with embodiments of the invention are discussed below.

Location Reporting of Collision Events

Figure 6:
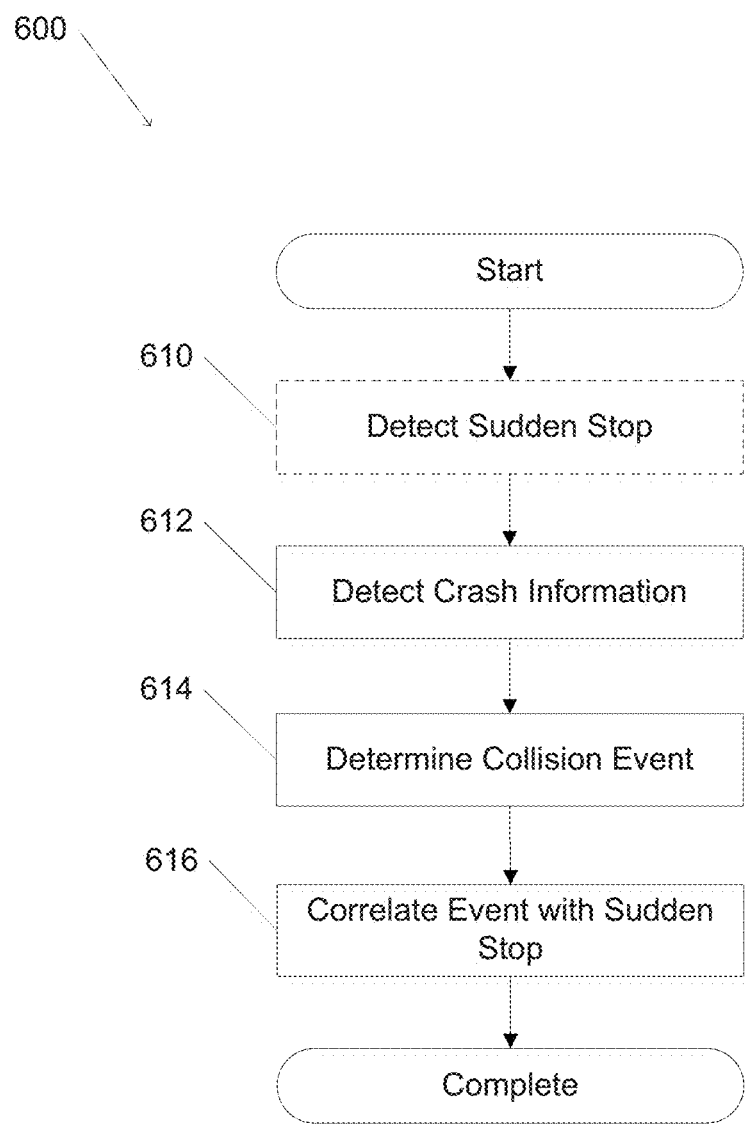
FIG. 6 is a flow chart illustrating a process for collision detection in accordance with an embodiment of the invention.

When a collision occurs, a variety of data can be captured by sensors installed in a vehicle. Data relevant to a collision can be captured before the collision occurs by an event reporting telematics unit. A process for the location reporting of collisions events in accordance with an embodiment of the invention is illustrated in FIG. 6. The process 600 includes detecting (610) a sudden stop in a variety of embodiments. Crash information is detected (612). A collision event is determined (614). The collision event is correlated (616) with the sudden stop.

In many embodiments, a sudden stop is detected (610) by measuring the acceleration of the vehicle using an acceleration sensor. In a variety of embodiments, a sudden stop is detected (610) by measuring the location of the vehicle using a location determination device. Other methods for determining a sudden stop not specifically described can be utilized in accordance with a number of embodiments of the invention. In a number of embodiments, a timestamp is associated with the detected (610) sudden stop. In several embodiments, crash information is detected (612) via one or more sensors, including, but not limited to, airbag deployment sensors, impact sensors, orientation sensors, and location sensors. In many embodiments, crash information can be detected (612) utilizing acceleration information captured using a 3-axis accelerometer. Systems and methods for calibrating and measuring acceleration information are disclosed in U.S. patent application Ser. No. 13/622,844, incorporated by reference above. Other sensors not specifically listed can be utilized in accordance with a variety of embodiments of the invention. In a number of embodiments, a timestamp is associated with the detected (612) crash information. A variety of processes can be utilized to determine (614) if a collision event has occurred in accordance with many embodiments of the invention, including, but not limited to, the processes described above with respect to FIG. 3. In a variety of embodiments, determining (614) if a collision event has occurred includes detecting (610) if the vehicle has suddenly stopped. In many embodiments, a timestamp is associated with the determined (614) collision event. In several embodiments, determining the location of the crash event includes correlating (616) the detected (614) collision event with the detected (612) collision information includes correlating (616) detected (612) collision information occurring prior to the detected (610) sudden stop. In several embodiments, correlating (616) the detected (614) collision event with the detected (612) collision information utilizes the location of the detected (610) sudden stop and/or timestamps associated with the detected (614) collision event, the detected (612) collision information, and/or the detected (610) sudden stop.

Specific processes for determining the location for the start of a collision event based upon acceleration information are discussed above with respect to FIG. 6; however, a variety of processes can be performed in accordance with embodiments of the invention.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. An event reporting telematics unit configured to report a location of events, comprising:
  a first sensor measuring sensor information;
  a storage device storing sensor information, location information, and an event reporting application; and
  a processor;
  wherein the processor, on reading the event reporting application, is directed to:
    receive a first sensor information using the first sensor, wherein the first sensor information comprises a first sensor information timestamp associated with the first sensor information;
    determine the start of an occurrence of a vehicle event, wherein the vehicle event comprises an acceleration event;
    complete the determination of the vehicle event, wherein the determined event comprises an event duration;
    correlate the first sensor information with the determined event based on the first sensor information timestamp;
    determine a time corresponding to the beginning of the determined event based on the first sensor information timestamp and the event duration;
    determine location data corresponding to the beginning of the determined event based on the location information; and
    store the determined event and the associated location data using the storage device.

2. The event reporting telematics unit of claim 1, further comprising:
  a second sensor measuring second sensor information; and
  wherein the processor further:
    receives a second sensor information using the second sensor;
    calculates a second sensor information timestamp, where the second sensor information timestamp is associated with the second sensor information; and
    correlates the second sensor information with the determined event based on the second sensor information timestamp.

3. The event reporting telematics unit of claim 2, wherein the processor further determines the location corresponding to the beginning of the vehicle event based on the information selected from the group consisting of the first sensor information timestamp and the second sensor information timestamp.

4. The event reporting telematics unit of claim 1, wherein the first vehicle sensor selected from the group consisting of an accelerometer, an airbag deployment sensor, a vibration sensor, a compass, a voltage measuring sensor, a resistance measuring sensor, a current measuring sensor, an impact sensor, and a temperature sensor.

5. The event reporting telematics unit of claim 1, further comprising:
a Global Positioning System (GPS) receiver; and
wherein the processor further:
determines the location information using the GPS receiver;
calculates a location timestamp associated with the determined first location; and
determines the location corresponding to the beginning of the determined event based on the location information, the location timestamp, and the first sensor information timestamp.

6. The event reporting telematics unit of claim 1, further comprising:
a Global Positioning System (GPS) receiver; and
wherein the processor further:
determines a set of location information using the GPS receiver;
calculates a set of location timestamps corresponding to one or more of the set of location information; and
estimates the location corresponding to the beginning of the determined event using at least one of the set of location timestamps and at least one of the set of location information.

7. The event reporting telematics unit of claim 6, wherein the processor further determines the location corresponding to the beginning of the determined event based on the first sensor information timestamp, at least one of the set of location information, and at least one of the set of location timestamps associated with the at least one of the set of location information.

8. The event reporting telematics unit of claim 1, wherein the processor further determines the location corresponding to the beginning of the determined event by performing a dead reckoning process based on the location information, the first sensor information, and the first sensor information timestamp.

9. The event reporting telematics unit of claim 1, wherein the processor further calculates the first sensor information timestamp when the first sensor information exceeds a threshold value.

10. The event reporting telematics unit of claim 1, further comprising:
a communications device;
wherein the processor further transmits the determined vehicle event and the location data using the communications device.

11. A method for determining a location of a vehicle event, comprising:
receiving a first sensor information using an event reporting telematics unit, wherein:
the first sensor information comprises a first sensor information timestamp associated with the first sensor information; and
the event reporting telematics unit comprises a processor and a memory connected to the processor;
determining a start of an occurrence of a vehicle event using the event reporting telematics unit, wherein the vehicle event comprises an acceleration event;
completing the determination of the vehicle event using the event reporting telematics unit, wherein the determined event comprises an event duration;
correlating the first sensor information with the determined event based on the first sensor information timestamp using the event reporting telematics unit;
determining a time corresponding to the beginning of the determined event based on the first sensor information timestamp and the event duration using the event reporting telematics unit;
determining location data corresponding to the beginning of the determined event based on location information using the event reporting telematics unit; and
storing the determined event and the associated location data using the event reporting telematics unit.

12. The method of claim 11, further comprising
receiving a second sensor information using the event reporting telematics unit;
calculating a second sensor information timestamp using the event reporting telematics unit, where the second sensor information timestamp is associated with the second sensor information; and
correlating the second sensor information with the determined event based on the second sensor information timestamp using the event reporting telematics unit.

13. The method of claim 12, further comprising determining the location corresponding to the beginning of the vehicle event based on the information selected from the group consisting of the first sensor information timestamp and the second sensor information timestamp using the event reporting telematics unit.

14. The method of claim 11, wherein the first vehicle sensor selected from the group consisting of an accelerometer, an airbag deployment sensor, a vibration sensor, a compass, a voltage measuring sensor, a resistance measuring sensor, a current measuring sensor, an impact sensor, and a temperature sensor.

15. The method of claim 11, further comprising:
determining the location information using a GPS receiver in the event reporting telematics unit;
calculating a location timestamp associated with the determined first location using the event reporting telematics unit; and
determining the location corresponding to the beginning of the determined event based on the location information, the location timestamp, and the first sensor information timestamp using the event reporting telematics unit.

16. The method of claim 11, further comprising:
determining a set of location information using a GPS receiver in the event reporting telematics unit;
calculating a set of location timestamps corresponding to one or more of the set of location information using the event reporting telematics unit; and
estimating the location corresponding to the beginning of the determined event based on at least one of the set of location timestamps and at least one of the set of location information using the event reporting telematics unit.

17. The method of claim 16, further comprising determining the location corresponding to the beginning of the determined event based on the first sensor information timestamp, at least one of the set of location information, and at least one of the set of location timestamps associated with the at least one of the set of location information using the event reporting telematics unit.

18. The method of claim 11, further comprising determining the location corresponding to the beginning of the determined event by performing a dead reckoning process based on the location information, the first sensor information, and the first sensor information timestamp using the event reporting telematics unit.

19. The method of claim 11, further comprising calculating the first sensor information timestamp when the first sensor information exceeds a threshold value using the event reporting telematics unit.

20. The method of claim 11, further comprising transmitting the determined vehicle event and the location data using the event reporting telematics unit.

* * * * *